United States Patent [19]
Oide

[11] Patent Number: 5,832,771
[45] Date of Patent: Nov. 10, 1998

[54] UNIVERSAL PUNCH PRESS FOR WORKING ON STEEL FRAME MEMBERS OF THE LIKE

[75] Inventor: Eisuke Oide, Yokohama, Japan

[73] Assignee: Kabushiki Kaisha Ogura, Japan

[21] Appl. No.: 863,950

[22] Filed: May 27, 1997

[30] Foreign Application Priority Data

May 31, 1996 [JP] Japan .................................. 8-138711

[51] Int. Cl.⁶ ........................... B21D 37/14; B21D 37/02
[52] U.S. Cl. .................... 72/442; 72/446; 483/28
[58] Field of Search ......................... 72/442, 446; 483/28

[56] References Cited

U.S. PATENT DOCUMENTS

| 3,995,470 | 12/1976 | Kamelander | 483/28 |
|---|---|---|---|
| 4,680,955 | 7/1987 | Sakamoto | 72/446 |
| 4,719,691 | 1/1988 | Klingel | 72/446 |

FOREIGN PATENT DOCUMENTS

| 6-126352 | 3/1987 | Japan | 483/28 |
|---|---|---|---|
| 62-57717 | 1/1989 | Japan | 483/28 |
| 4-28430 | 1/1992 | Japan | 72/446 |
| 6-7851 | 1/1994 | Japan | 483/28 |
| 1-11029 | 5/1994 | Japan | 483/28 |
| 6-142814 | 5/1994 | Japan | 483/28 |

OTHER PUBLICATIONS

Feldman, H.D. "Werkzeugwechsel in der Umformtechnik" (tool change in metal working) of VDI–Zeitung 131 (1989), No. 9 – Sep. pp. 111–118.

Primary Examiner—David Jones
Attorney, Agent, or Firm—Dickstein Shapiro Morin & Oshinsky LLP

[57] ABSTRACT

A hydraulic punch press for use with a set of interchangeable tool assemblies for boring, cutting, bending, or otherwise working on semi-finished steel frame members or the like. Included are a punch press section having a hydraulic cylinder for driving a tool assembly, a toolholder section having a turntable on which tool seats are arranged radially for carrying a set of tool assemblies, and a guideway section for transfer of a tool assembly between punch press section and toolholder section. The turntable is rotatable to bring any of the tool seats to a tool transfer position where a tool assembly may be transferred to or back from the punch press section by way of the guideway. Each tool assembly is normally locked to one tool seat by two lockpins. One lockpin is automatically released when the associated tool seat comes to the tool transfer position, and the other when a positioning arm is manipulated to retain the tool seat in that position. Additional embodiments are disclosed.

17 Claims, 12 Drawing Sheets

UNIVERSAL PUNCH PRESS FOR WORKING ON STEEL FRAME MEMBERS OF THE LIKE

BACKGROUND OF THE INVENTION

This invention relates to punch presses in general and, in particular, to a universal punch press that lends itself to use with a set of interchangeable tool assemblies for a variety of punching operations. The universal punch press according to the invention is particularly well suited for boring, cutting, bending, or otherwise working on semifinished steel frame members, although no unnecessary limitations to this particular application are intended.

Punch presses have been known and used extensively which have a hydraulic cylinder mounted upstandingly to the top horizontal limb, or overarm, of a C frame. The hydraulic cylinder drives an underlying tool assembly replaceably mounted to the C frame. It has also been known to incorporate a hydraulic power unit, comprising a hydraulic pump and an electric drive motor therefor, in the punch press for internally driving the hydraulic cylinder, rather than externally from a separate power unit. Hydraulic punch presses of this general character have been put to use with a separate set of interchangeable tool assemblies such as those for boring or perforating, cutting, bending, notching, or otherwise punching steel frame members.

There has, however, been a problem left unsolved with such hydraulic punch presses. They had no means for mounting a tool assembly to the C frame, dismounting it, and remounting a different tool assembly. Such operations had to be done purely manually, necessarily involving the lifting of the tool assemblies to and from the C frame. The exchange of the tool assemblies was therefore very tiring and time-consuming, particularly in cases where the tool assemblies were bulky and heavy.

SUMMARY OF THE INVENTION

The present invention has it as an object to provide a universal punch press that permits easy exchange from one tool assembly to another, no matter how bulky or heavy the tool assemblies may be.

Another object of the present invention is to provide a punch press incorporating a movable toolholder having a plurality of tool seats formed thereon for holding a set of interchangeable tool assemblies, from which toolholder any desired tool assembly may be readily transferred to its working position under the tool drive means.

Another object of the present invention is to positively and exactly retain any desired tool seat on the toolholder in a predetermined tool transfer position where a tool assembly is to be transferred from that tool seat to the working position, or where a used tool assembly is to be received back from under the tool drive means.

A further object of the present invention is to positively lock each tool assembly against displacement on the toolholder and, nevertheless, to readily unlock each tool assembly when it is moved to the tool transfer position.

Briefly, the invention may be summarized as a universal punch press capable of use with a variety of interchangeable tool assemblies for variously working on blanks such as steel frame members, among other applications. The punch press comprises punch press means to be replaceably loaded with a desired one of a set of interchangeable tool assemblies, guideway means having one extremity disposed adjacent the punch press means for enabling each tool assembly to travel into and away from the punch press means, and a toolholder having a plurality of tool seats for carrying a set of interchangeable tool assemblies. The toolholder is movable relative to the guideway means for bringing any of the tool seats to a predetermined transfer position adjacent another extremity of the guideway means, each tool assembly being capable of transfer between a tool seat on the toolholder being held in the transfer position and the guideway means. Also included are means for positioning any of the tool seats on the toolholder in the transfer position, and means for locking each tool assembly against displacement on the toolholder.

Typically, the toolholder takes the form of a turntable, with a set of tool assemblies disposed at constant angular spacings thereon for radial sliding motion. The circular toolholder is preferred because of its compactness. Alternatively, however, the toolholder may be shaped into an elongate rectangle and made movable longitudinally, with a set of tool assemblies disposed at constant longitudinal spacings. The rectangular toolholder offers the advantage that only a longer toolholder is required for carrying a greater number of tool assemblies.

According to a further feature of the invention, each tool seat on the toolholder is provided with means for locking a tool assembly against displacement thereon. The locking means may comprise two lockpins slidably mounted to the turntable and sprung into locking engagement with each tool assembly. One of the lockpins may be made automatically to release the tool assembly when the associated tool seat comes to the tool transfer position.

The other lockpin should be allowed to unlock the tool assembly only after the toolholder is locked in the tool transfer position by the positioning means. Toward this end a swing arm is employed as the positioning means in one preferred embodiment of the invention. Pivoted to the guideway means, the swing arm is to be manipulated into positioning engagement with the toolholder when any of the tool seats thereon is brought to the tool transfer position. The lockpin is adapted to be moved by the swing arm out of locking engagement with the tool assembly upon positioning engagement of the swing arm with the toolholder.

In this manner each tool assembly is normally positively retained in place on the turntable by the two lockpins. When carried to the tool transfer position, however, the tool assembly is automatically released from both lockpins simply as the positioning arm is swung into positioning engagement with the toolholder. Tool exchange will thus be greatly expedited without the risk of the tool assemblies running off the toolholder in the act of exchange or during standby.

The above and other features and advantages of this invention and the manner of realizing them will become more apparent, and the invention itself will best be understood, from a study of the following description and appended claims, with reference had to the attached drawings showing the preferred embodiments of the invention.

DESCRIPTION OF THE PREFERRED EMBODIMENTS

Figure 1:
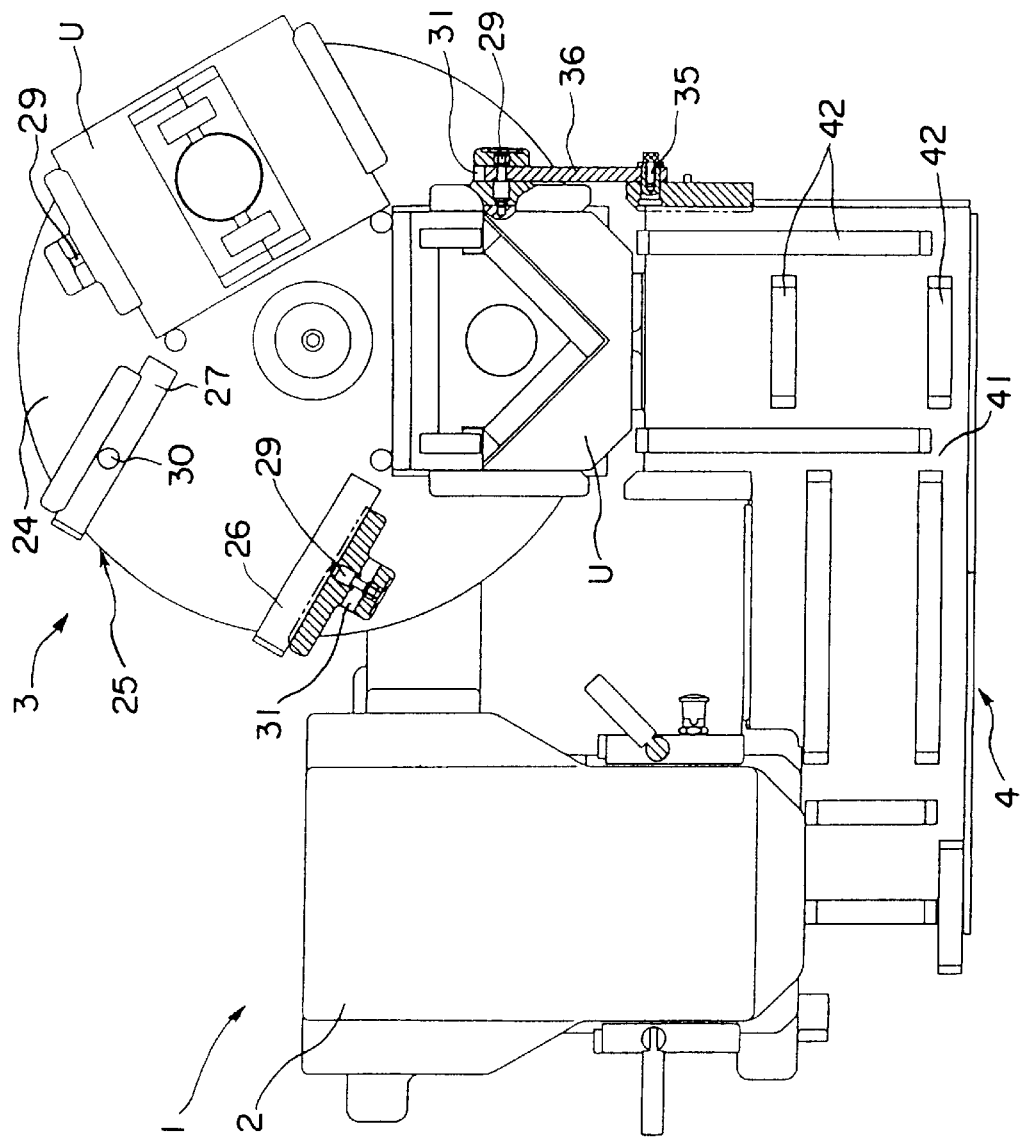
FIG. 1 is a top plan, partly sectioned for clarity, of the universal punch press constructed in accordance with the novel concepts of this invention.
Figure 2:
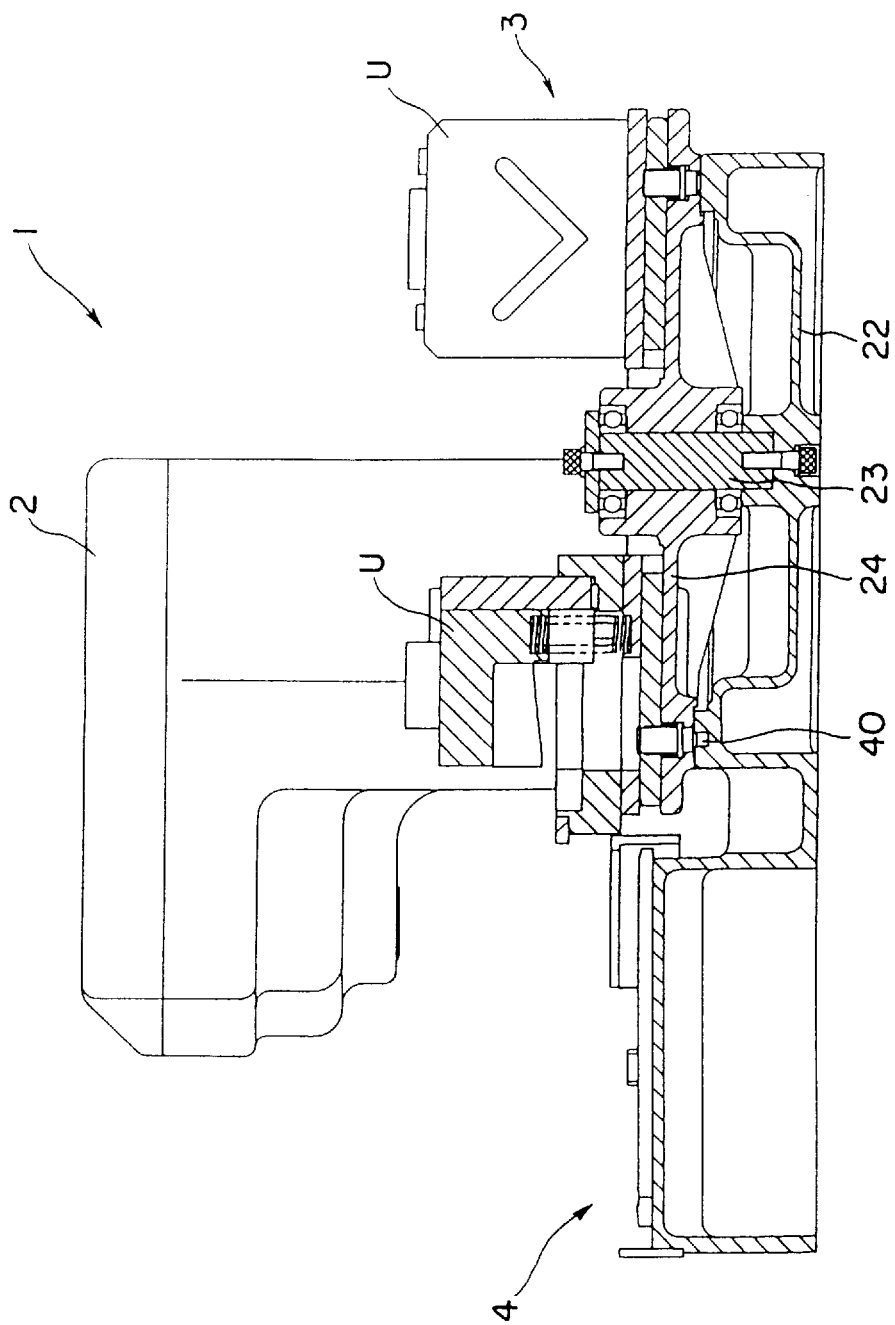
FIG. 2 is a right hand side elevation, partly sectioned for clarity, of the universal punch press of FIG. 1.

The universal punch press according to the present invention is shown in one preferred form thereof in FIGS. 1 and 2 and therein generally designated 1. The representative punch press 1 may be best envisaged as a combination of punch press means 2 including hydraulic drive means shown in FIGS. 3 and 4, toolholder means 3 for holding a set of interchangeable tool assemblies U, and guideway means 4 along which the tool assemblies are to be moved, one at a time, between punch press means 2 and toolholder means 3.

Figure 3:
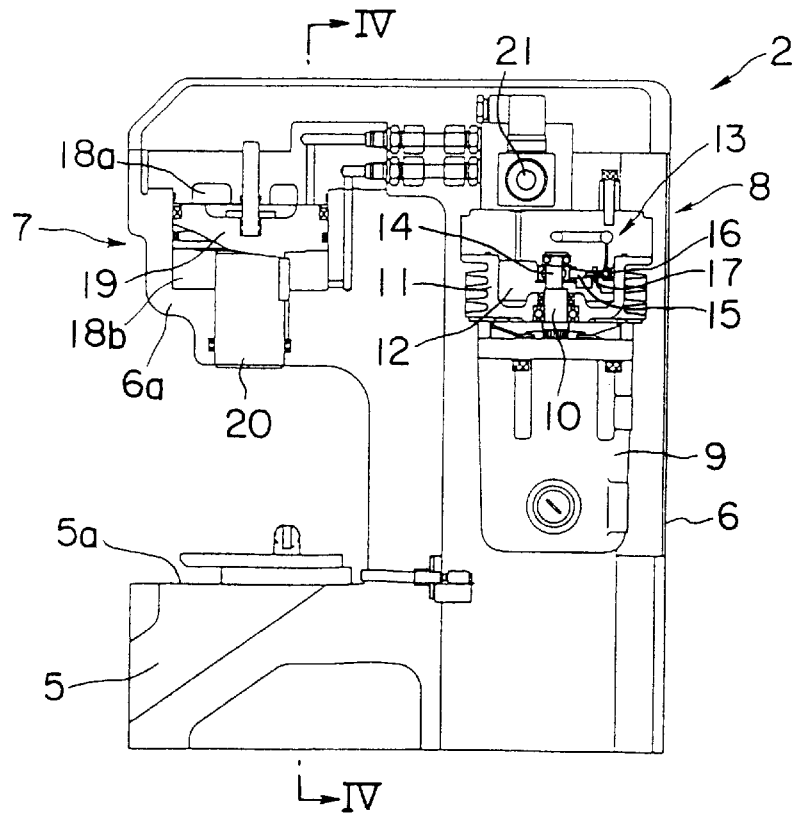
FIG. 3 is an illustration of the punch press section of the FIG. 1 machine, showing in particular the hydraulic drive means within the C frame of the punch press section.
Figure 4:
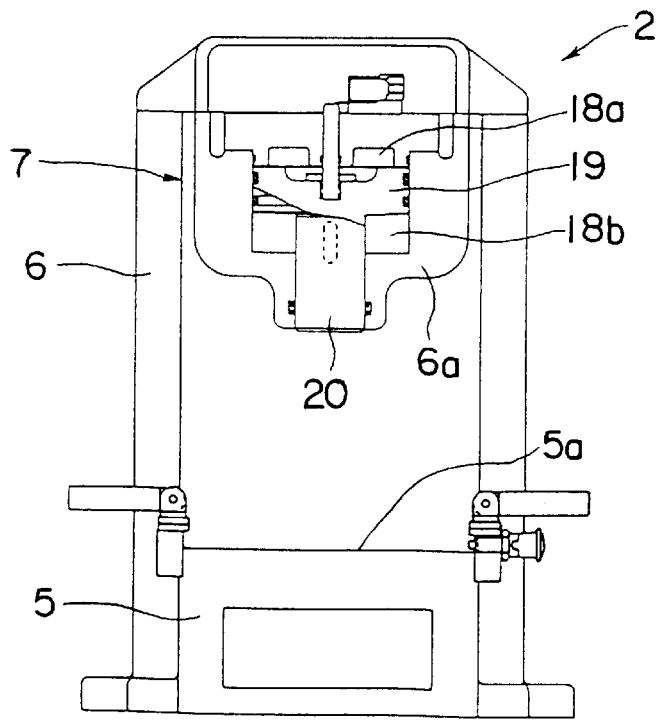
FIG. 4 is a section taken along the line IV—IV of FIG. 3.

Reference is directed to FIGS. 3 and 4 for more detailed discussion of the punch press means 2. Included in the means 2 is a C frame comprised of a bed 5 providing a tool mount 5a, a column 6 erected on the bed, and an overarm 6a extending horizontally from the top end of the column into a parallel spaced relation with the tool mount. Any desired one of the tool assemblies U is to be transferred from the toolholder means 3 onto the tool mount 5a via the guideway means 4 and to be driven by the hydraulic drive means for performing a desired punching operation on semifinished steel frame members, not shown, or the like.

Such drive means include a double acting hydraulic cylinder 7 built into the overarm 6a and spaced upwardly from the tool mount 5a, a hydraulic pump 8 built into the column 6 for supplying pressurized fluid to the cylinder, and an electric drive motor 9 coupled directly to the pump for driving the same. The cylinder 7 has a piston rod 20 depending therefrom for acting on the tool assembly on the tool mount 5a.

The drive motor 9 has its armature shaft 10 extending into the casing 11 of the pump 8 for driving its pumping means 13 and hence for causing the same to supply a hydraulic fluid, normally oil, under pressure from a pump chamber 12 into the hydraulic cylinder 7. The pumping means 13 is shown to comprise a rotary cam 14 formed on an extension of the motor armature shaft 10, a piston 15 reciprocated by the cam 14, a check valve 16 which is loaded by a spring 17 to hold normally closed the fluid passageway to the cylinder 7.

The cylinder 7 has a piston 19 slidably but pressure tightly mounted therein, thereby dividing its interior into a pair of opposed fluid chambers 18a and 18b. These fluid chambers communicate with the pump 5 via a directional control valve 22 whereby the pressurized fluid from the pump is directed alternately into the pair of fluid chambers for moving the piston 19, together with the piston rod 20 depending therefrom, up and down relative to the frame overarm 6a. The piston rod 20 when lowered acts directly on the tool assembly for causing the same to bend, cut, bore, or otherwise acts on the blank.

With reference back to FIGS. 1 and 2 the toolholder means 3 include a toolholder 24 which takes the form of a turntable in this particular embodiment. The turntable 24 is mounted on a base 22 for rotation about an upstanding spindle 23. A plurality of, three in this embodiment, tool seats 25 are provided on the turntable 24 at constant angular spacings about its axis of rotation. FIG. 1 shows two of the three tool seats 25 occupied by tool assemblies U, and the other one left unoccupied.

Each tool seat 25 is formed by a pair of guide rails 26 and 27 extending parallel to each other. Slidably engaged by the guide rails 26 and 27, each tool assembly U is constrained to linear travel radially of the turntable 24. Such linear sliding of the tool assemblies is, however, normally prevented both by first locking means 29 on each first guide rail 26 and by second locking means 30 on each second guide rail 27. The two locking means 29 and 30, constituting important features of this invention, will be detailed hereafter.

FIGS. 5–13 are all detailed illustrations of the first locking means 29, as well as of means for positioning each tool seat in a predetermined tool transfer position adjacent one extremity of the guideway means 4. The first locking means 29 are closely associated with the positioning means as the first locking means of each tool seat are automatically unlocked by the positioning means when that tool seat is positioned in the tool transfer position.

Figure 5:
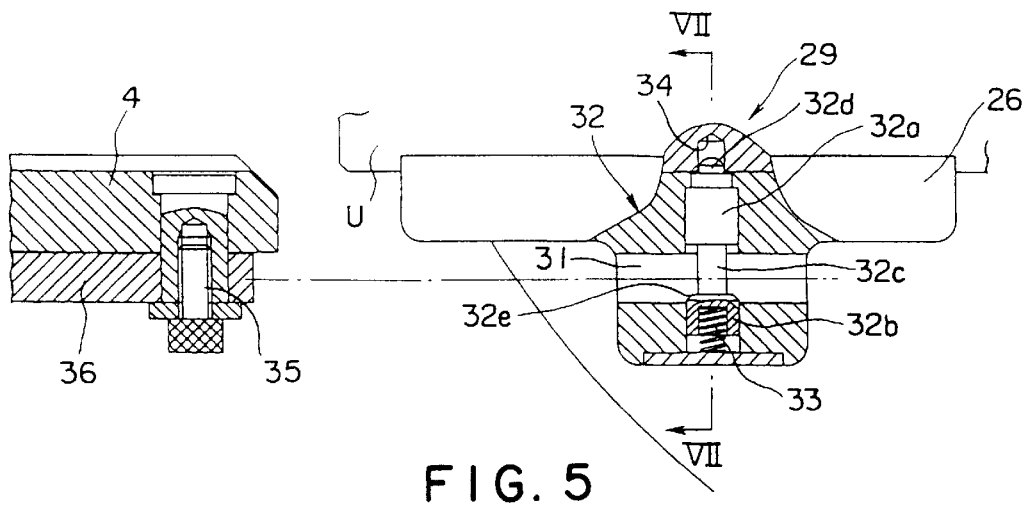
FIG. 5 is an enlarged, fragmentary top plan, with parts shown sectioned for clarity, of one of the first locking means on the turntable, the first locking means being shown with its lockpin locking a tool assembly to the turntable, the view also showing means for positioning the turntable in the tool transfer position because of the close association of the first locking means with the positioning means.
Figure 6:
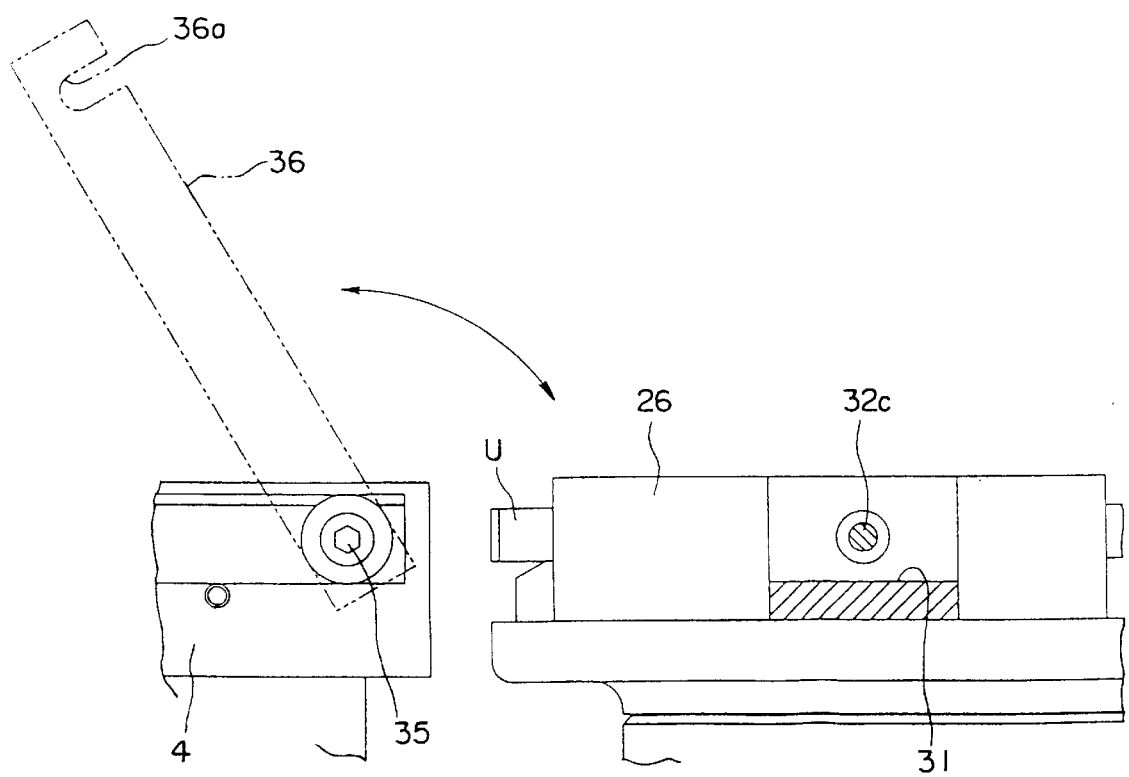
FIG. 6 is a side elevation of the showing of FIG. 5, with parts shown sectioned for clarity.
Figure 7:
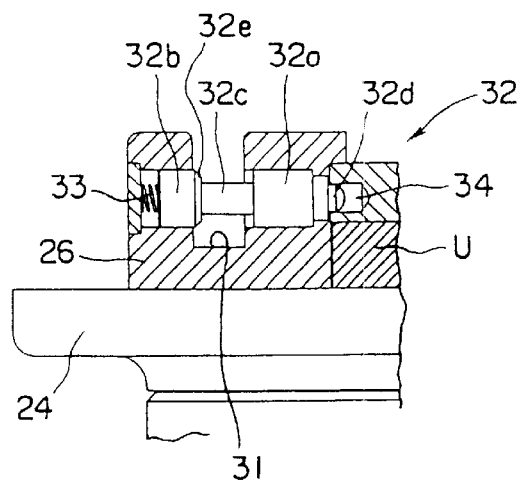
FIG. 7 is a section taken along the line VII—VII in FIG. 5.

A consideration of FIGS. 5–7 in particular will show that the first locking means 29 include a lockpin 32 extending horizontally across a groove 31 which is formed in each first guide rail 26 so as to extend longitudinally thereof. The lockpin 32 is formed to include two lands or larger diameter portions 32a and 32b at or adjacent the opposite ends thereof, an annular groove 32c between the lands, and a reduced diameter extension 32d projecting from the land 32a. The lands 32a and 32b are slidably received respectively in two aligned holes cut in the guide rail 26 on both sides of the groove 31. Urged by a helical compression spring 33, the lockpin 32 has its extension 32d normally engaged in a hole 34 in the tool assembly U, thereby locking the same against sliding along the guide rails 26 and 27.

The first locking means 29 of the foregoing construction are associated as aforesaid with the positioning means comprising a swing arm 36 seen in FIGS. 5 and 6 as well as in FIGS. 8–13. Pivoted at 35 to the guideway means 4, the swing arm 36 is pivotable in a vertical plane into and out of engagement in the groove 31 of each tool seat when that tool seat is in the tool transfer position. Any desired tool seat can be positively retained in the tool transfer position upon engagement of the swing arm 36 in the groove 31. There is absolutely no possibility of the turntable 24 undergoing angular displacement during the transfer of a tool assembly U between turntable 24 and guideway means 4.

Figure 8:
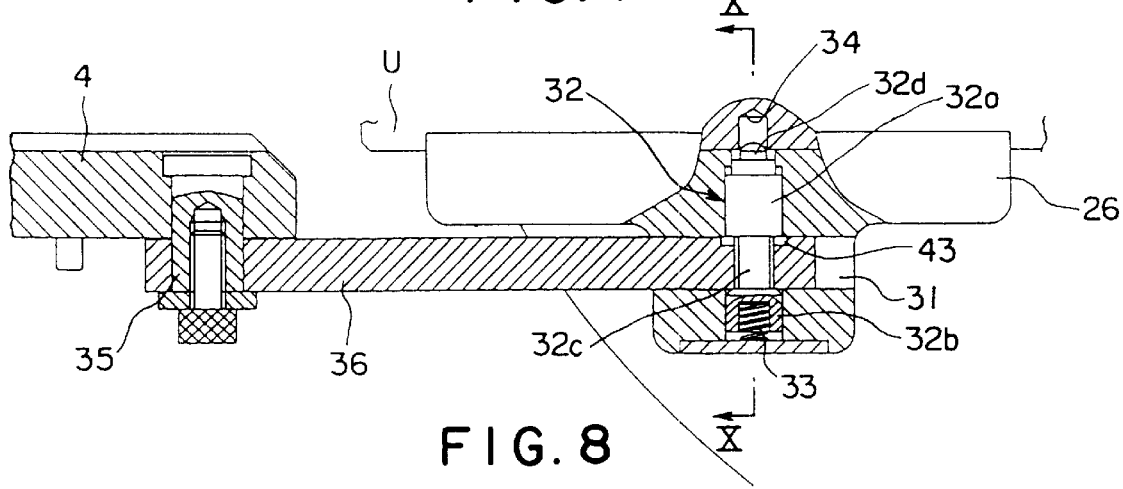
FIG. 8 is a view similar to FIG. 5 except that the tool assembly is shown semilocked by the lockpin of the first locking means as the positioning means is operated to retain the turntable in the tool transfer position.
Figure 9:
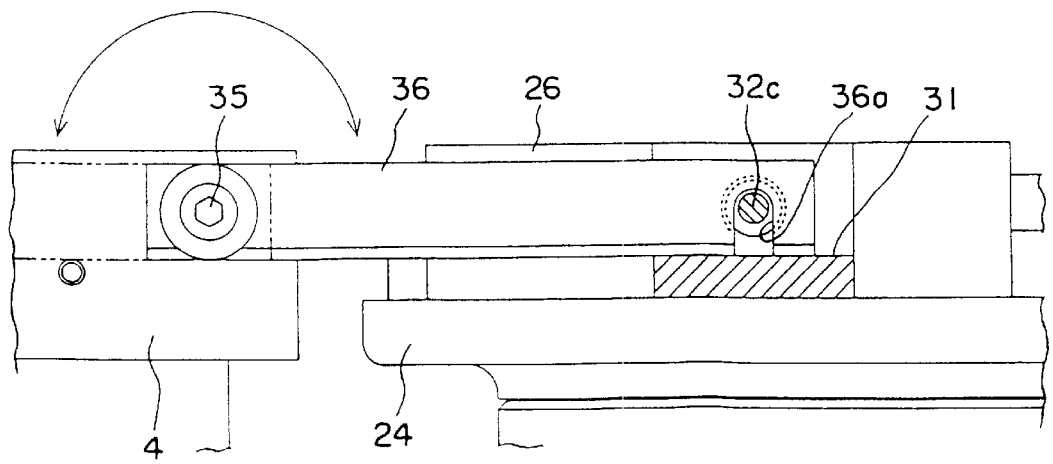
FIG. 9 is a view similar to FIG. 6 except that the positioning means is shown operated as in FIG. 8.

FIGS. 6, 8 and 9 reveal an indentation 36a formed in the swing arm 36 adjacent its free end. The noted annular groove 32c in the lockpin 32 is received in the indentation 36a in the swing arm 36 upon engagement of the swing arm in the groove 31. In thus engaging the lockpin 32 the swing arm 36 will slide over a taper 32e between land 32b and grove 32c of the lockpin thereby causing the same to withdraw from the hole 34 against the force of the compression spring 33 and hence to unlock the tool assembly U. It will thus be appreciated that the swing arm 36 serves the dual purpose of positioning each tool seat in the tool transfer position and releasing the tool assembly, if any, from the first locking means 29.

Figure 14:
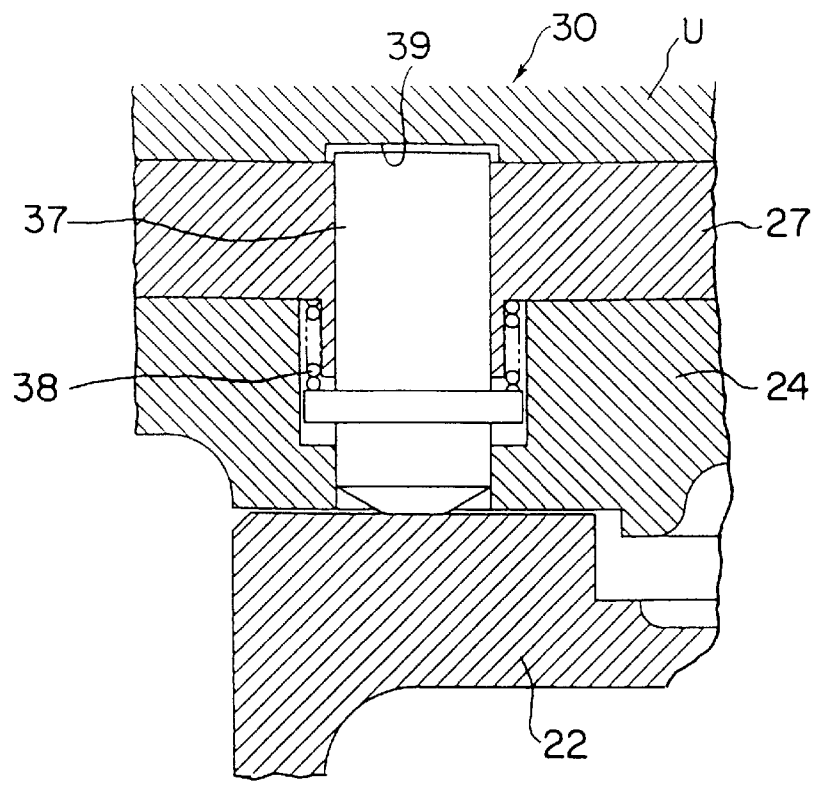
FIG. 14 is an enlarged, fragmentary, vertical section through the toolholder section of the FIG. 1 punch press, the view showing in particular one of the second locking means on the turntable, the second locking means being here shown with its lockpin in locking engagement with one tool assembly.
Figure 15:
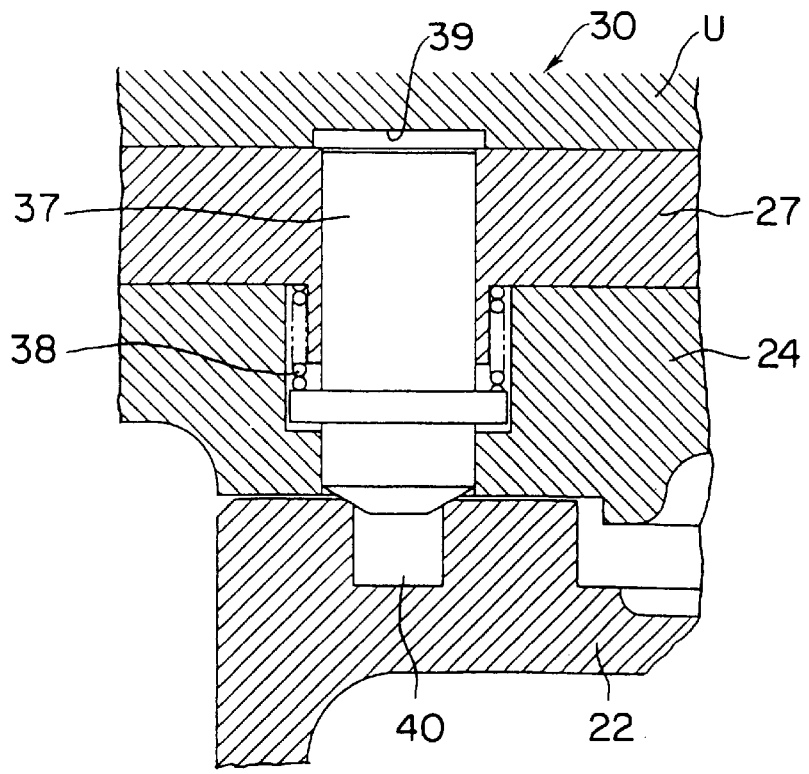
FIG. 15 is a view similar to FIG. 14 except that the lockpin of the second locking means is sprung out of locking engagement with the tool assembly.

The second locking means 30, on the other hand, are shown in detail in FIGS. 14 and 15. Included is a lockpin 37 slidably received in two vertically aligned holes cut in and through the turntable 24 and each second guide rail 27. Normally, as illustrated in FIG. 14, each lockpin 37 has its bottom end in abutting, slidable engagement with the base 22 under the bias of a helical compression spring 38 and has its top end portion in locking engagement in a hole 39 in each tool assembly U. When the tool seat in question is brought to the tool transfer position, however, the lockpin 37 has its bottom end portion sprung into an unlocking hole 40, FIG. 15, in the base 22 and has its top end portion withdrawn from the hole 39 in the tool assembly U.

As best illustrated in FIG. 1, the guideway means 4 has a guideway 41 which is L shaped as seen in a plan view as in this figure. The guideway 41 has one extremity disposed adjacent the tool mount 5a, FIGS. 3 and 4, of the punch press means 2, and another extremity adjacent the turntable 24 of the toolholder means 3. Preferably, guide strips of low friction material may be provided as at 42 on the guideway 41 in order to cause the tool assemblies U to slide smoothly between tool mount 5a and turntable 24.

Operation

In use of the universal punch press 1 of the foregoing construction, the toolholder 24 may be loaded with a set of tool assemblies U that will be required in the intended application of the machine. Each tool assembly when properly positioned on one tool seat 25 will be locked against displacement by the two locking means 29 and 30.

For mounting any desired one of the loaded tool assemblies U to the punch press means 2, the turntable 24 may be revolved, either manually or by power, until the desired tool assembly comes to the tool transfer position opposite the guideway 41. As illustrated in FIG. 15, the lockpin 37 of the second locking means 30 will be sprung into the unlocking hole 40 in the turntable base 22, thereby releasing the tool assembly U, when this tool assembly comes to the tool transfer position.

Figure 10:
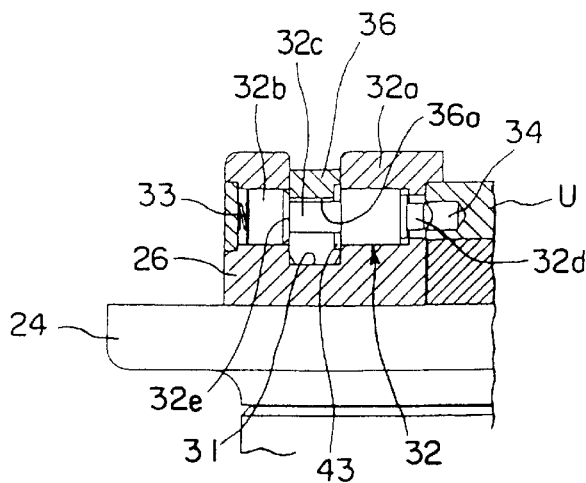
FIG. 10 is a section taken along the line X—X in FIG. 8.

Automatically released from the second locking means 30 in the tool transfer position, the tool assembly is not yet free to leave the tool seat since it is still locked by the first locking means 29, as depicted in FIGS. 5–7. The swing arm 36 of the first locking means 29 may therefore be manually turned into engagement in the groove 31 in the guide rail 26. FIGS. 8–10 illustrate the swing arm 36 thus engaged in the groove 31, positively locking the turntable 24 in the tool transfer position. There is now absolutely no likelihood of the turntable 24 accidentally revolving and so jeopardizing or making impossible the subsequent transfer of the tool assembly to the guideway 41.

During engagement in the groove 31, as above, the swing arm 36 will act on the taper 32e of the lockpin 32, as in FIGS. 8 and 10, with the consequent withdrawal of the lockpin out of locking engagement in the hole 34 in the tool assembly U against the force of the spring 33. The tool assembly is now ready for travel toward the punch press means 2.

Figure 13:
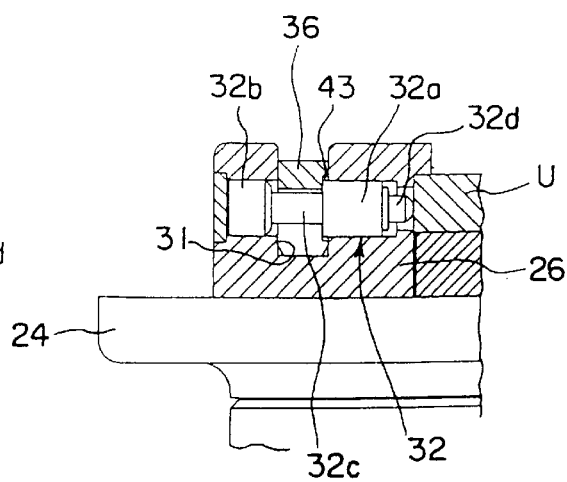
FIG. 13 is a section taken along the line XIII—XIII in FIG. 11.
Figure 11:
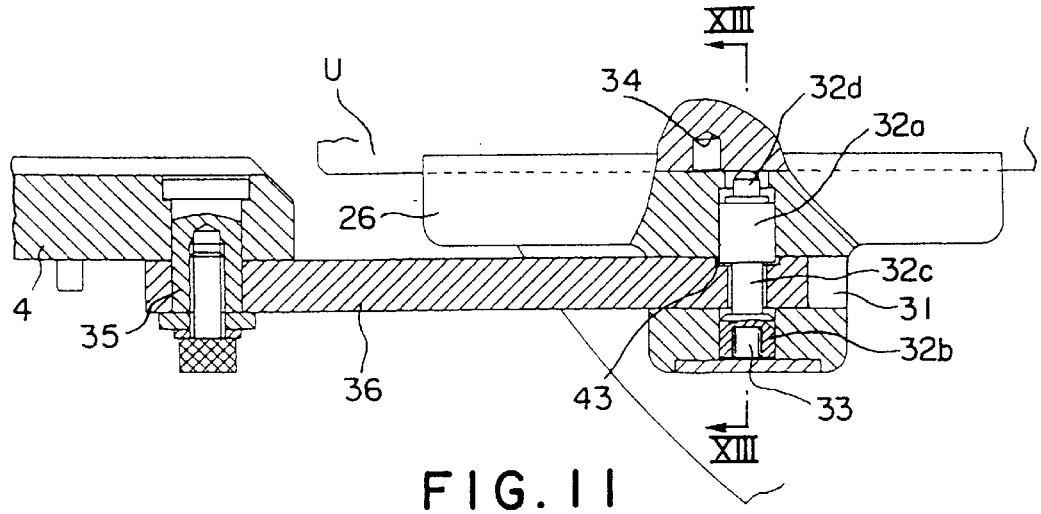
FIG. 11 is a view similar to FIG. 8 except that the tool assembly is shown moved out of semilocked engagement with the lockpin of the first locking means.
Figure 12:
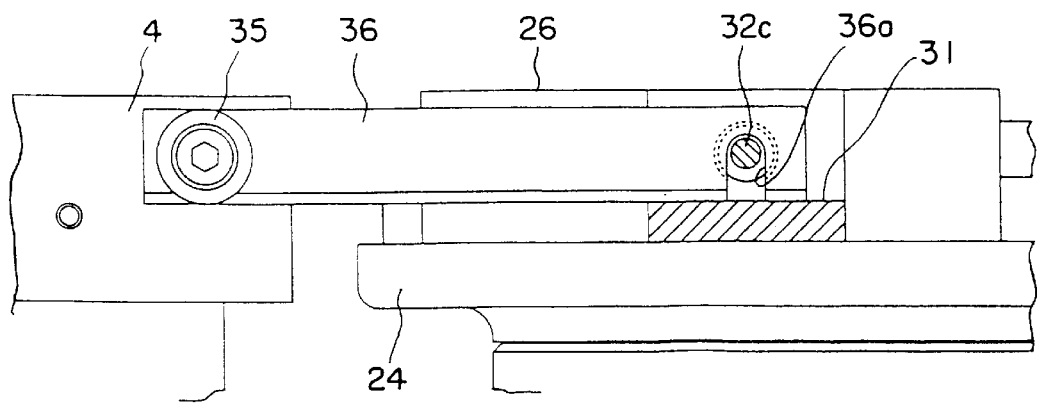
FIG. 12 is a view similar to FIG. 9 except that the tool assembly is completely unlocked as in FIG. 11.

A closer study of FIGS. 8 and 10 will reveal, however, that the lockpin 32 does not completely retract from the tool assembly hole 34 under the action of the swing arm 36 on the lockpin taper 32e but is left slightly engaged in the tool assembly hole. The degree of engagement is such that tool assembly U may now be described as being semilocked, not to slide along the guide rails 26 and 27 under relatively small force or touch but to do so when pushed with a greater force. In this latter case, as illustrated in FIGS. 11–13, the lockpin 32 will thoroughly withdraw from the tool assembly hole 34 against the force of the spring 33. No greater force will be required thereafter for pushing the tool assembly, now completely unlocked, away from the turntable 24 onto the guideway 41.

Preferably, and as shown in FIGS. 11 and 13, a relatively shallow depression may be formed as at 43 in the swing arm 36 for receiving the larger diameter portion 32a of the lockpin 32 upon complete withdrawal thereof from the tool assembly hole 34. In this manner the swing arm 36 will be locked against accidental disengagement from the groove 31 during subsequent transfer of the tool assembly U from turntable 24 to guideway 41.

After being moved onto the guideway 41, the tool assembly may be slid over the guide strips 42 on the guideway and onto the tool mount 5a of the punch press means 2. Then the tool assembly may be conventionally mounted in position on the tool mount 5a and conventionally driven by the hydraulic cylinder 7 for performing a desired punching operation on the work.

It is considered self evident from the foregoing how the used tool assembly is returned from punch press means 2 to toolholder means 3 and locked in place on one tool seats 25 on the turntable 24. It will thus be appreciated that an exchange from one tool assembly to another is far easier and quicker than heretofore now matter how large and heavy the tool assemblies may be.

Second Form

Figure 16:
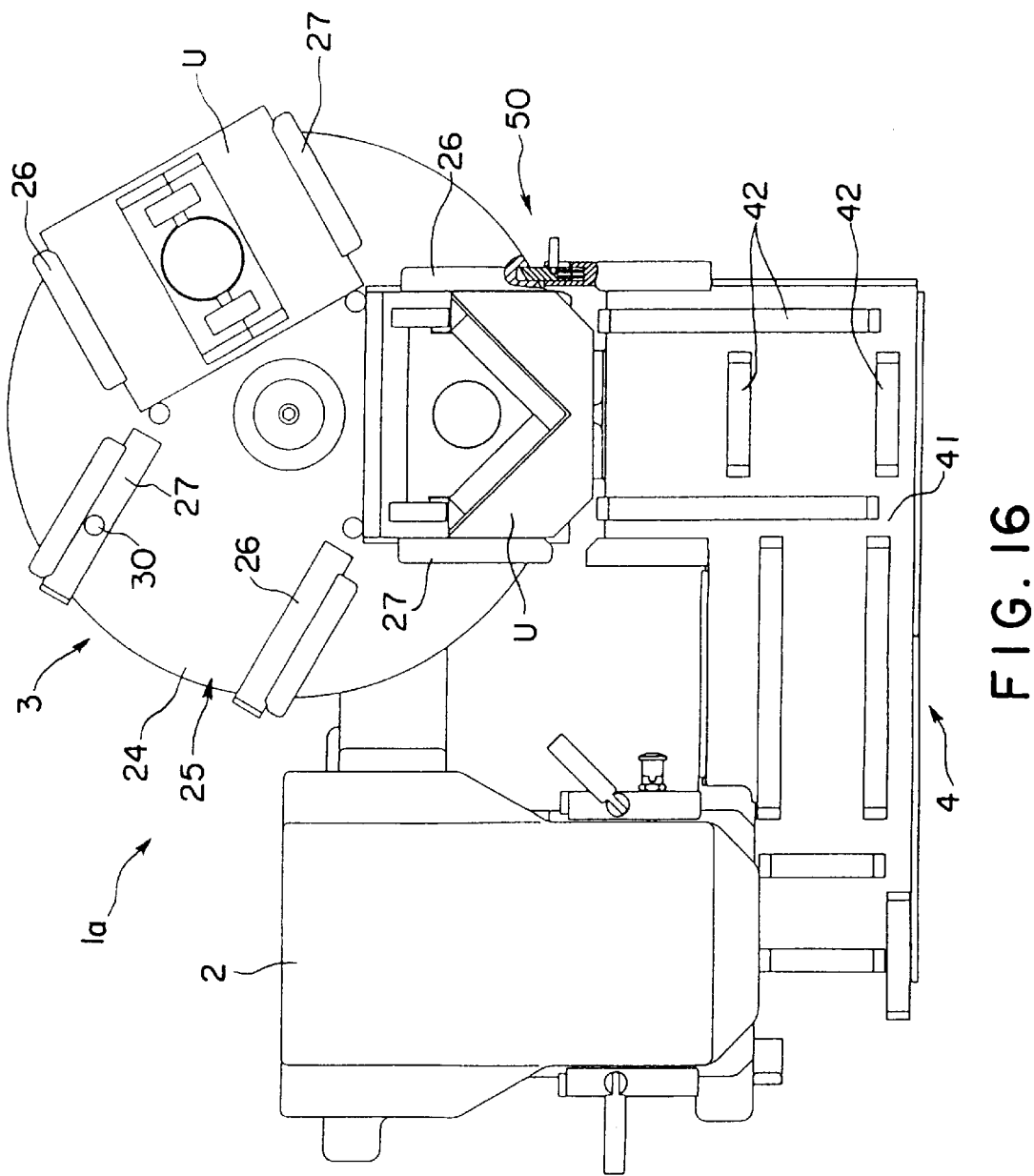
FIG. 16 is a view similar to FIG. 1 but showing a modified punch press according to the present invention.
Figure 17:
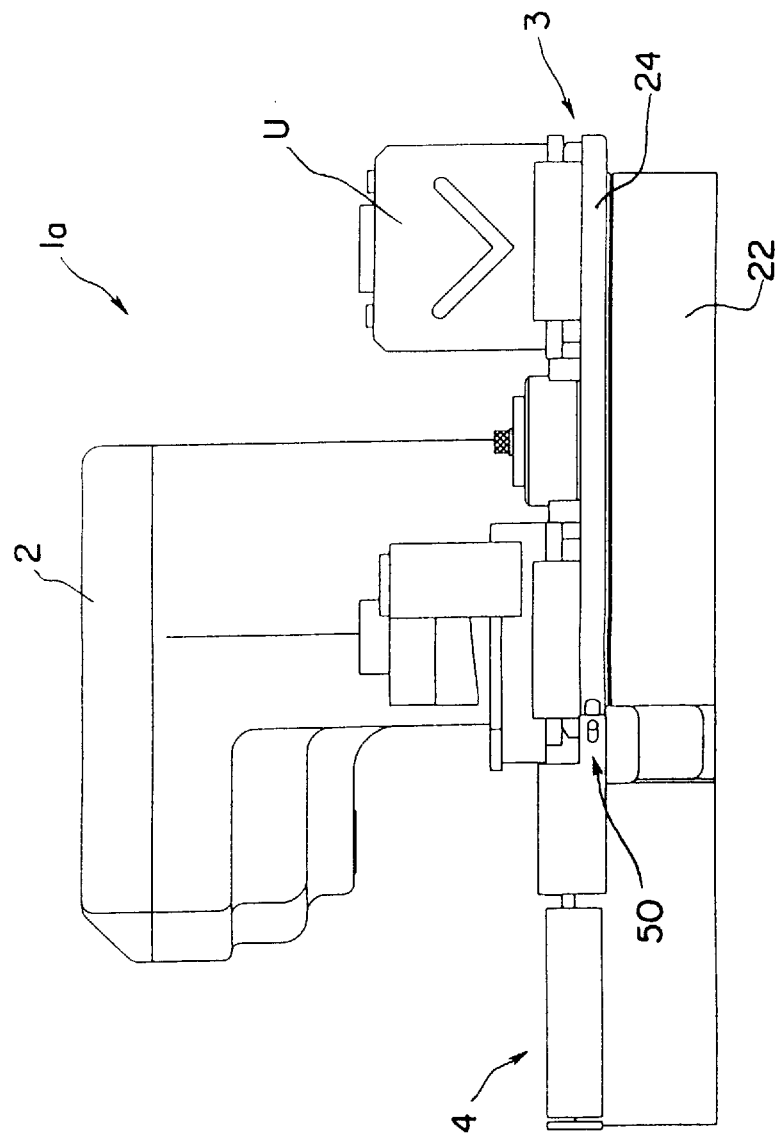
FIG. 17 is a right hand side elevation of the FIG. 16 punch press.

FIGS. 16 and 17 show a modified punch press 1a featuring positioning means 50 used in substitution for the first locking means 29 and positioning arm 36 of the first disclosed punch press 1.

Figure 18:
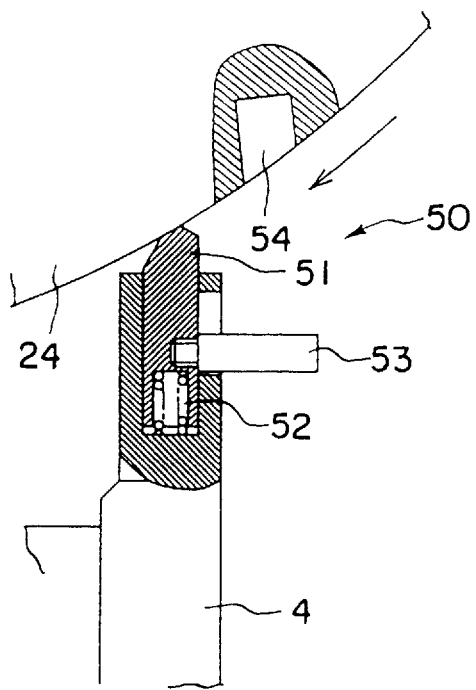
FIG. 18 is an enlarged, fragmentary section through the FIG. 16 punch press, showing in particular a modification of positioning means, with a positioning pin being here shown out of positioning engagement with the turntable.
Figure 19:
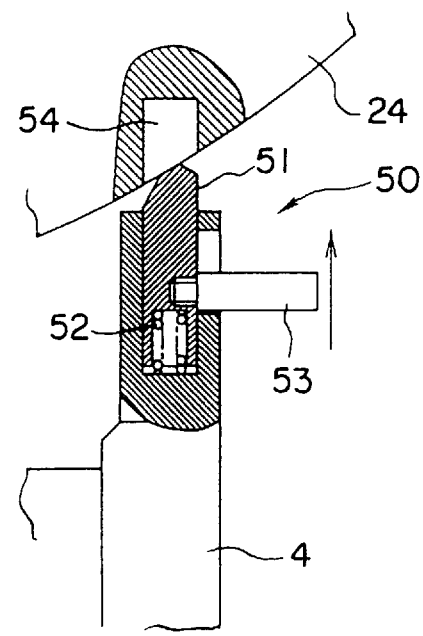
FIG. 19 is a view similar to FIG. 18 except that the positioning pin is shown ready for positioning engagement with the turntable.
Figure 20:
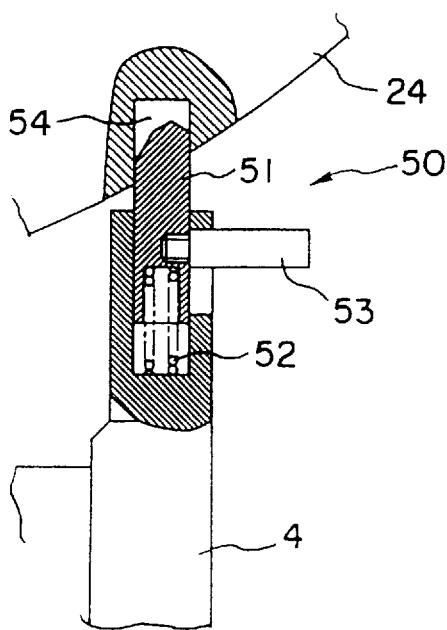
FIG. 20 is also a view similar to FIG. 18 except that the positioning pin is shown in positioning engagement with the turntable.

As illustrated on an enlarged scale in FIGS. 18–20, the positioning means 50 include a positioning pin 51 mounted to the guideway means 4 for linear sliding motion into and out of positioning engagement in a hole 54 in the periphery of the turntable 24. It is understood that the turntable 24 has as many such holes 54 as there are tool seats 25 thereon, so that each tool seat may be retained exactly in the tool transfer position upon engagement of the positioning pin 51 in the associated hole 54.

A helical compression spring 52 biases the positioning pin 51 into engagement in any hole 54. A handle 53 is coupled to the positioning pin 51 for use in withdrawing the same from the holes 54, as well as for limiting its stroke. The other details of construction are as previously set forth with reference to FIGS. 1–15 except that the tool units are locked on the turntable only by the second locking means 30.

For retaining any tool seat on the turntable 24 in the tool transfer position, the positioning pin 51 may be suitably held retracted, or left in sliding contact with the turntable periphery, during turntable rotation, as shown in FIG. 18. Then the positioning pin may be allowed to be sprung into the turntable hole 54 when the desired tool seat comes to the tool transfer position, as will be apparent from FIGS. 19 and 20. The handle 53 may be moved away from the turntable against the bias of the spring 52 for disengaging the positioning pin from the turntable hole. Tool exchange will thus be easier than in the preceding embodiment as the turntable is positioned automatically or semiautomatically.

Third Form

Figure 21:
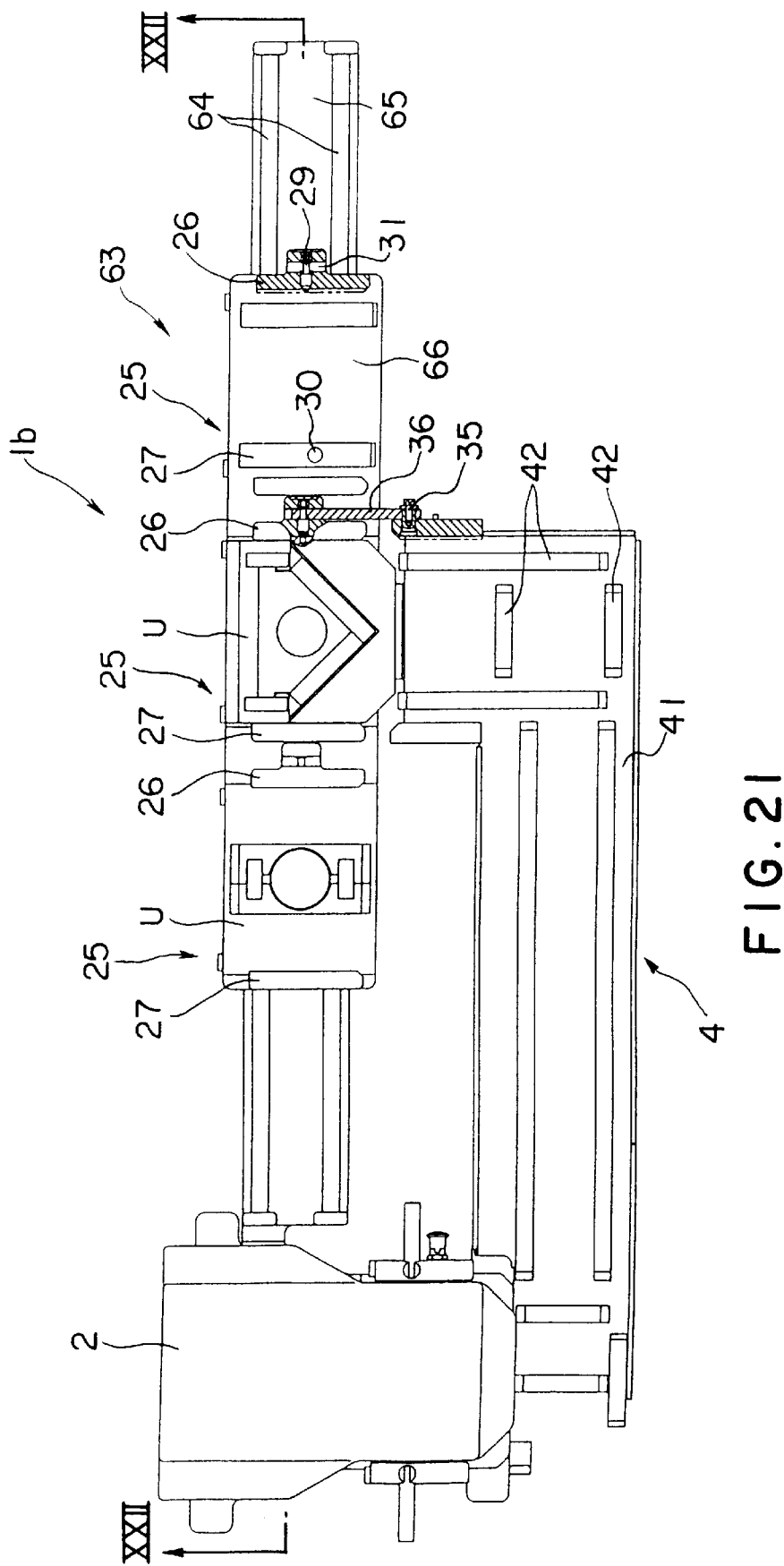
FIG. 21 is a view similar to FIG. 1 but showing another modified punch press according to the present invention.
Figure 22:
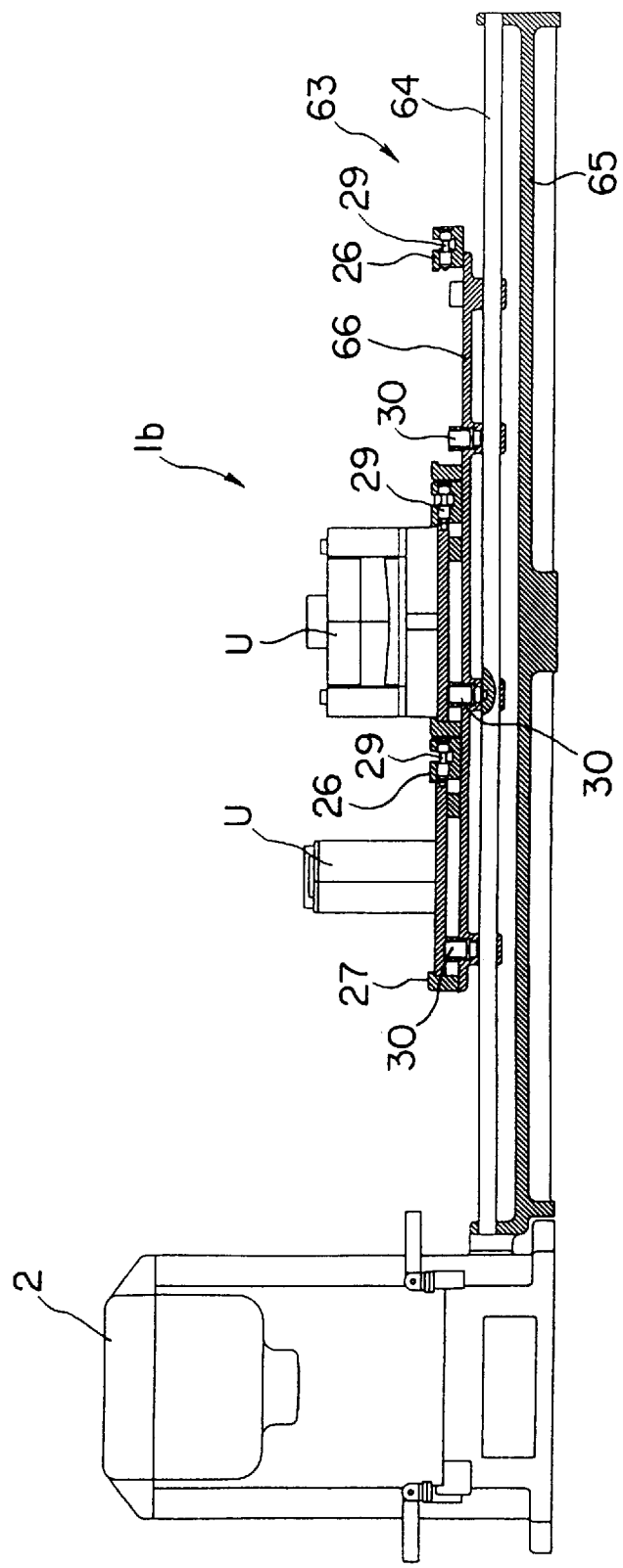
FIG. 22 is a view taken along the line XXII—XXII in FIG. 21.

In FIGS. 21 and 22 is shown another modified punch press 1b having toolholder means 63 in place of the toolholder means 3 of the FIGS. 1–15 punch press 1. The toolholder means 63 include an elongate table 66 which is movable linearly along a pair of guide rails 64 on a fixed base 65 past a tool transfer position adjacent one extremity of a guideway 41. The toolholder table 66 is shown to have three tool seats 25 in longitudinally spaced positions thereon for carrying as many different tool assemblies U, two such tool assemblies being shown loaded on the table by way of example. Each tool seat 25 is formed by a pair of guide rails 26 and 27 extending transversely of the table 66.

The modified punch press 1b is substantially identical in the other details of construction with the punch press 1. Thus, for example, each tool seat 26 is provided with the two locking means 29 and 30 for locking a tool assembly thereon, and the swing arm 36 is pivoted at 35 to the guideway means 41 both for positioning each tool seat in the tool transfer position and for releasing the tool assembly from the first locking means 69.

The operation of the punch press 1b is also analogous with that of the first disclosed machine 1 except that the toolholder 66 is linearly moved back and forth to bring any desired tool seat to the tool transfer position. The linearly traveling toolholder 66 offers the advantage that all that is required to accommodate a greater number of tool assemblies is to increase the lengths of the toolholder and the guide rails 64.

Notwithstanding the foregoing detailed disclosure it is not desired that the present invention be limited by the exact showing of the drawings or the description thereof. For instance, the punch press means may drive the tool assemblies mechanically, instead of hydraulically as in the illustrated embodiment. The guideway means may also be variously modified, it being only required by the invention that the tool assemblies be readily transferable between punch press means and toolholder means. Various other modifications and alterations of the illustrated embodiments may be resorted to without departure from the scope of the invention as expressed in the attached claims.

What is claimed is:

1. A universal punch press capable of use with a variety of interchangeable tool assemblies for variously working on steel frame members, among other applications, comprising:
    (a) punch press means to be replaceably loaded with a desired one of a set of interchangeable tool assemblies for working on steel frame members or the like;
    (b) guideway means providing a guideway having a first extremity disposed adjacent the punch press means for enabling each tool assembly to travel into and away from the punch press means;
    (c) toolholder means including a toolholder having a plurality of tool seats for carrying a set of interchangeable tool assemblies, the toolholder being movable relative to the guideway means for moving any of the tool seats to a predetermined tool transfer position adjacent a second extremity of the guideway, each tool assembly being capable of transfer between the second extremity of the guideway and a tool seat on the toolholder when that tool seat is in the tool transfer position;
    (d) means for positioning any of the tool seats on the toolholder in the transfer position; and
    (e) means for locking each tool assembly against displacement on the toolholder.

2. The universal punch press of claim 1 wherein the positioning means comprises a positioning member mounted to the guideway means for movement into and out of positioning engagement with the toolholder when any of the tool seats thereon is in the tool transfer position.

3. The universal punch press of claim 2 wherein the positioning member is a swing arm pivotable into and out of positioning engagement with the toolholder.

4. The universal punch press of claim 2 wherein the positioning member is a positioning pin movable linearly into and out of positioning engagement with the toolholder.

5. The universal punch press of claim 4 wherein the positioning means further comprises resilient means for urging the positioning pin into positioning engagement with the toolholder.

6. The universal punch press of claim 1 wherein the locking means comprises:
    (a) a lockpin mounted to the toolholder for movement into and out of locking engagement with each tool assembly; and
    (b) resilient means biasing each lockpin into locking engagement with one tool assembly.

7. The universal punch press of claim 6 wherein the positioning means comprises a positioning member mounted to the guideway means for movement into and out of positioning engagement with the toolholder when any of the tool seats thereon is in the tool transfer position, and wherein each lockpin is adapted to be retracted by the positioning member out of locking engagement with one tool assembly against the bias of the resilient means when the positioning member is moved into positioning engagement with the toolholder.

8. The universal punch press of claim 1 wherein the toolholder means further comprises a base on which the toolholder is movably mounted, and wherein the locking means comprises:
   (a) a lockpin mounted to the toolholder for movement into and out of locking engagement with each tool assembly, the lockpin having a first end in locking engagement with the tool assembly and a second end in slidable abutment against the base of the toolholder means when the tool assembly is in other than the tool transfer position;
   (b) resilient means biasing each lockpin out of locking engagement with one tool assembly; and
   (c) there being a recess in the base of the toolholder means for receiving the second end of the lockpin under the bias of the resilient means, and hence for causing the tool assembly to be unlocked, when the tool assembly comes to the tool transfer position.

9. The universal punch press of claim 1 wherein the toolholder means further comprises a base on which the toolholder is movably mounted, and wherein the locking means comprises:
   (a) a first lockpin mounted to the toolholder for movement into and out of locking engagement with each tool assembly;
   (b) first resilient means biasing each first lockpin into locking engagement with one tool assembly;
   (c) a second lockpin mounted to the toolholder for movement into and out of locking engagement with each tool assembly, the second lockpin having a first end in locking engagement with the tool assembly and a second end in slidable abutment against the base of the toolholder means when the tool assembly is in other than the tool transfer position;
   (d) second resilient means biasing each second lockpin out of locking engagement with one tool assembly; and
   (e) there being a recess in the base of the toolholder means for receiving the second end of the second lockpin under the bias of the second resilient means, and hence for causing the tool assembly to be unlocked, when the tool assembly comes to the tool transfer position.

10. The universal punch press of claim 1 wherein the toolholder is a rotary turntable having the tool seats arranged radially thereon, the tool assemblies being movable radially of the turntable to and from the guideway.

11. The universal punch press of claim 1 wherein the toolholder is an elongate table movable linearly relative to the guideway means and having the tool seats arranged at longitudinal spacings thereon, the tool assemblies being movable transversely of the table to and from the guideway.

12. A universal punch press for use with a variety of interchangeable tool assemblies, comprising:
   a punch press replaceably loaded with interchangeable tool assemblies;
   a guideway having a first extremity adjacent to said punch press and a second extremity, wherein said guideway allows said interchangeable tool assemblies to travel to and from said punch press;
   a toolholder having a plurality of tool seats for carrying said interchangeable tool assemblies, said toolholder located adjacent to said second extremity of said guideway;
   a positioning member mounted on said guideway to position said plurality of tool seats on said toolholder to selectively engage or disengage said interchangeable tool assemblies from said tool seats; and
   a lock mounted to said toolholder to selectively engage or disengage said interchangeable tool assemblies against displacement on a tool seat of said toolholder.

13. The universal punch press according to claim 12, wherein said positioning member is a positioning pin movable linearly into and out of positioning engagement with said toolholder.

14. The universal punch press according to claim 12, wherein said positioning member is a swing arm pivotable into and out of positioning engagement with said toolholder.

15. The universal punch press according to claim 12, wherein said lock is a lockpin including a resilient member which biases said lockpin into locking engagement.

16. The universal punch press according to claim 12, wherein said toolholder is an elongate table movable linearly relative to said guideway.

17. The universal punch press according to claim 12, wherein said toolholder is a rotary turntable moveable radially relative to said guideway.

* * * * *